United States Patent
Fukushima

(10) Patent No.: US 11,477,376 B2
(45) Date of Patent: Oct. 18, 2022

(54) IMAGE CAPTURING APPARATUS, CONTROL METHOD THEREOF, AND RECORDING MEDIUM STORING PROGRAM

(71) Applicant: CANON KABUSHIKI KAISHA, Tokyo (JP)

(72) Inventor: Yuki Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 16/849,841

(22) Filed: Apr. 15, 2020

(65) Prior Publication Data

US 2020/0344416 A1 Oct. 29, 2020

(30) Foreign Application Priority Data

Apr. 23, 2019 (JP) .............................. JP2019-082143

(51) Int. Cl.
| | |
|---|---|
| *H04N 5/225* | (2006.01) |
| *H04N 5/232* | (2006.01) |
| *G03B 17/56* | (2021.01) |
| *G03B 7/097* | (2021.01) |

(52) U.S. Cl.
CPC ......... *H04N 5/23245* (2013.01); *G03B 7/097* (2013.01); *G03B 17/56* (2013.01); *H04N 5/23216* (2013.01)

(58) Field of Classification Search
CPC ..... H04N 5/23216; G03B 7/097; G03B 17/56
See application file for complete search history.

(56) References Cited

FOREIGN PATENT DOCUMENTS

| | | |
|---|---|---|
| JP | 2008-205841 A | 9/2008 |
| JP | 2010-98589 A | 4/2010 |

*Primary Examiner* — Gary C Vieaux
(74) *Attorney, Agent, or Firm* — Canon U.S.A., Inc. IP Division

(57) ABSTRACT

The present disclosure is directed to preventing an operation from being performed in an operation mode that is not intended by a user. In an image capturing apparatus, a moving image lever is an operation member for issuing an instruction to change an operation mode to a moving image capturing mode that is a state where a moving image is recordable. In order to avoid unintentional change of the operation mode to the moving image capturing mode due to an erroneous operation on the moving image lever, a setting is made to enable and disable an instruction that is issued by operating the moving image lever. If the setting is changed to "disable" while the image capturing apparatus is operating in the moving image capturing mode, a microcomputer changes an operation mode to a still image capturing mode.

15 Claims, 9 Drawing Sheets

IMAGE CAPTURING APPARATUS, CONTROL METHOD THEREOF, AND RECORDING MEDIUM STORING PROGRAM

BACKGROUND

Field of the Disclosure

The present disclosure relates to an electronic apparatus, a control method thereof, and a storage medium storing a program.

Description of the Related Art

There are techniques that relate to the operability of an electronic apparatus. Examples are described below.

Japanese Patent Application Laid-Open No. 2010-98589 discusses a technique in which a shortcut key is disabled in a case where no key input is detected for a predetermined period of time after the turning on of a mobile device and an image capturing apparatus is detected. In this way, key operations are automatically restricted as the situation demands.

Japanese Patent Application Laid-Open No. 2008-205841 discusses a technique in which only a release operation and an operation on a registered main item and a registered sub-item are allowed in a case where an operation of an image capturing apparatus is locked. In this way, a user-desired function is set operable even in a case where an operation of a camera is locked.

There is an electronic apparatus that includes an operation member for issuing an instruction to change an operation mode to a predetermined operation mode, and the operation member is configured to be operated by a one-touch operation to facilitate the change of the operation mode to the predetermined operation mode with ease. Meanwhile, in order to avoid unintentional change of the operation mode to the predetermined operation mode due to an erroneous operation on the operation member, the user may wish to make a setting to enable and disable an instruction that is issued by operating the operation member. While the setting is made to "disable", an instruction that is issued by operating the operation member is continually disabled.

In this case, however, if the setting is changed to "disable" while the electronic apparatus is operating in the predetermined operation mode, there arises an inconsistency between the setting being "disable" and the operation mode being the predetermined operation mode, and this can confuse the user.

The technique discussed in Japanese Patent Application Laid-Open No. 2010-98589 is to automatically restrict key operations based on the predetermined time, which is different from a technique in which an instruction that is issued by operating the operation member is disabled as the user wishes.

The technique discussed in Japanese Patent Application Laid-Open No. 2008-205841 is to restrict operations in the case where the operation of the image capturing apparatus is locked, which is different from a technique in which an instruction that is issued by operating the operation member is continually disabled while the setting is "disable".

Japanese Patent Application Laid-Open Nos. 2010-98589 and 2008-205841 do not discuss clearing an inconsistency that arises when the setting is changed to "disable" while the electronic apparatus is operating in the predetermined operation mode as described above.

SUMMARY

The present disclosure is in view of the above-described point and is directed to a technique for reducing a situation where an operation is performed in an operation mode that is not intended by a user.

According to an aspect of the present invention, an electronic apparatus includes an operation member configured to issue an instruction to change an operation mode, and at least one memory and at least one processor which function as a setting unit configured to set a restriction state where changing the operation mode to a first operation mode by operating the operation member is restricted, and a control unit configured to perform control to change the operation mode to a second operation mode different from the first operation mode in a case where the restriction state is set by the setting unit when the operation mode is set to the first operation mode.

Further features of the present disclosure will become apparent from the following description of exemplary embodiments with reference to the attached drawings.

DESCRIPTION OF THE EMBODIMENTS

An exemplary embodiment of the present invention will be described below with reference to the attached drawings.

Figure 1:
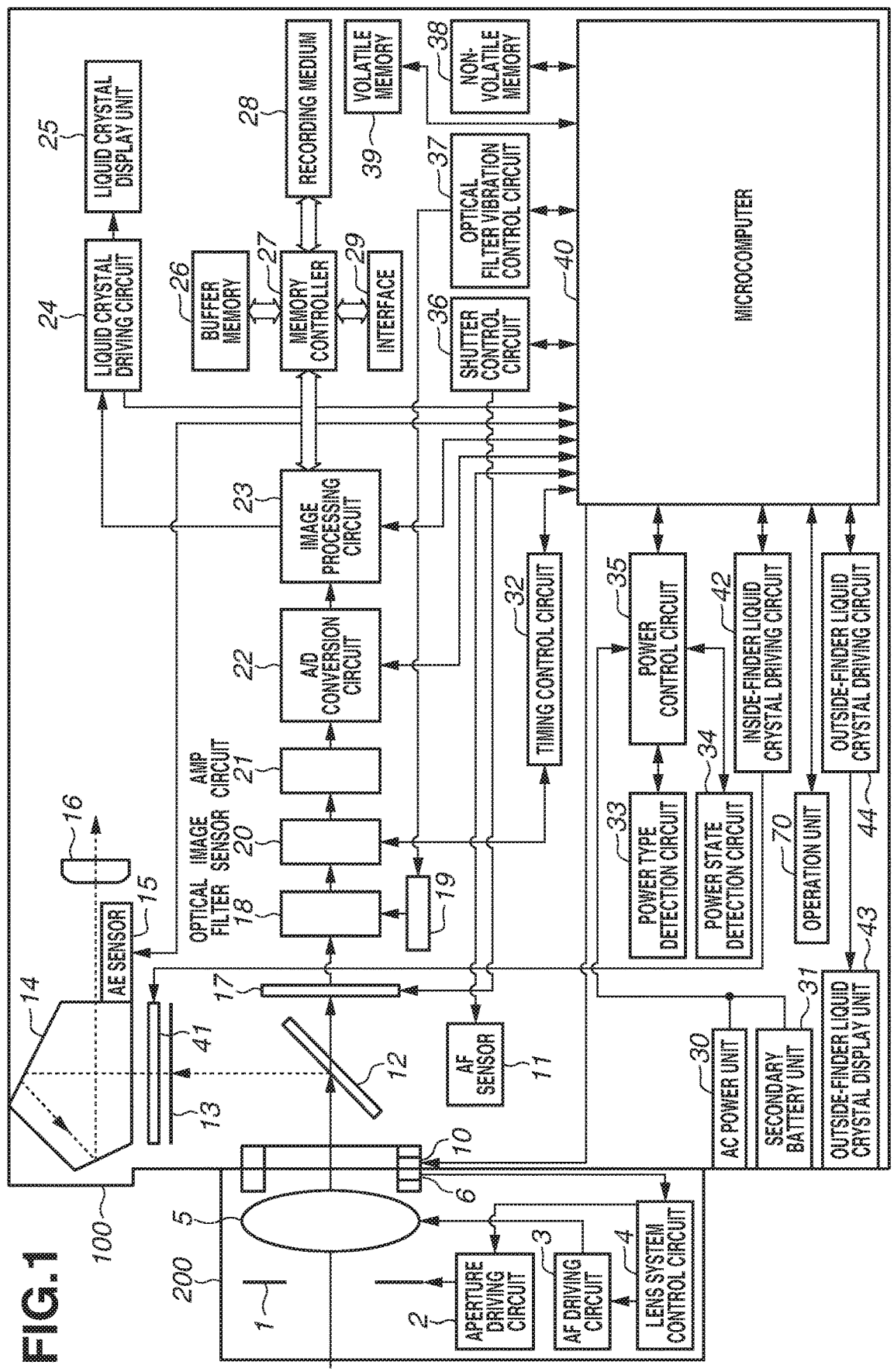
FIG. 1 illustrates an example of a configuration of an image capturing apparatus.

FIG. 1 illustrates an example of a configuration of an image capturing apparatus 100 according to an exemplary embodiment. The image capturing apparatus 100 according to the exemplary embodiment is an example of an electronic apparatus to which the present invention is applied. In the present exemplary embodiment, a digital single-lens reflex camera will be described as an image capturing apparatus.

A lens unit 200 with a lens 5 mounted thereon is interchangeably attached to the image capturing apparatus 100. The lens 5 generally consists of a plurality of lenses but is illustrated simply as a single lens.

A communication terminal 6 is a communication terminal for the lens unit 200 to communicate with the image capturing apparatus 100. A communication terminal 10 is a communication terminal for the image capturing apparatus 100 to communicate with the lens unit 200. The lens unit 200 communicates with a microcomputer 40 of the image capturing apparatus 100 via the communication terminals 6 and 10, controls an aperture 1 using a lens system control circuit 4 via an aperture driving circuit 2, and focuses by changing the position of the lens 5 via an autofocus (AF) driving circuit 3. The microcomputer 40 of the image capturing apparatus 100 acquires an open aperture value and a minimum aperture value of the lens unit 200 via the communication terminals 6 and 10.

An AF sensor 11 outputs defocus amount information to the microcomputer 40.

The microcomputer 40 controls the lens unit 200 based on the defocus amount information.

A quick return mirror 12 is moved upward and downward by an actuator (not illustrated) under control of the microcomputer 40. The quick return mirror 12 is normally arranged to reflect light flux so that the light flux is guided to a finder 16 (mirror down). The user capturing an image can check the focal point and composition of an optical subject image acquired through the lens unit 200 by observing a focusing screen 13 through a pentaprism 14 and the finder 16. An auto-exposure (AE) sensor 15 measures the luminance of a subject through the lens unit 200. During the image capturing or live view display, the quick return mirror 12 is moved upward so that light flux is guided to an image sensor 20 of an image capturing unit and the quick return mirror 12 is drawn back from the light flux (mirror up).

A focal plane shutter 17 controls an exposure time of the image sensor 20 under control of the microcomputer 40. An optical filter 18 includes a low-pass filter and cuts high-frequency components of light coming through the focal plane shutter 17 and guides the light of a subject image to the image sensor 20. The image sensor 20 uses a charge-coupled device (CCD) sensor or a complementary metal oxide semiconductor (CMOS) sensor and photoelectrically converts the subject image formed on the image sensor 20 through the lens unit 200 into an electric signal and captures the electric signal. An amplification (AMP) circuit 21 amplifies the captured electric signal using a gain that corresponds to a set image capturing sensitivity. An analog/digital (A/D) conversion circuit 22 converts an analog signal converted into the electric signal by the image sensor 20 into a digital signal.

An image processing circuit 23 performs filter processing, color conversion processing, and gamma/knee processing on image data converted into a digital signal by the A/D conversion circuit 22 and outputs the processed data to a memory controller 27. The image processing circuit 23 includes a built-in digital/analog conversion circuit (built-in D/A conversion circuit). The image processing circuit 23 converts image data converted into a digital signal by the A/D conversion circuit 22 and image data input from the memory controller 27 into an analog signal and outputs the analog signal to a liquid crystal display unit 25 via a liquid crystal driving circuit 24. The above-described image processing and display processing performed by the image processing circuit 23 are switched by the microcomputer 40. The microcomputer 40 performs white balance adjustment based on color balance information about the captured image.

The liquid crystal display unit 25 is a rear monitor configured to display an image. The display is not limited to a display that employs a liquid crystal method, but a display of any other display method, such as an organic electroluminescent (organic EL) method, that displays an image can be used.

The memory controller 27 stores unprocessed image data input from the image processing circuit 23 onto a buffer memory 26 and stores image data having undergone image processing onto a recording medium 28. In addition, the memory controller 27 acquires image data from the buffer memory 26 or the recording medium 28 and outputs the acquired image data to the image processing circuit 23. The memory controller 27 is capable of storing image data transmitted from the outside via an interface 29 onto the recording medium 28 and outputting image data stored on the recording medium 28 to the outside via the interface 29. The interface 29 is, for example, a universal serial bus (USB) interface, an Institute of Electrical and Electronics Engineers (IEEE) interface, or a High-Definition Multimedia Interface (HDMI) (registered trademark). The recording medium 28 can be a removable recording medium, such as a memory card, or a built-in memory.

A timing control circuit 32 controls a timing of driving the image sensor 20 under control of the microcomputer 40.

A power control circuit 35 controls the power supplied from an AC power unit 30 or a secondary battery unit 31. The power control circuit 35 receives an instruction from the microcomputer 40 and turns on and off the power. The power control circuit 35 notifies the microcomputer 40 of current power state information detected by a power state detection circuit 34 and current power type information detected by a power type detection circuit 33.

A shutter control circuit 36 controls the focal plane shutter 17 under control of the microcomputer 40. An optical filter vibration control circuit 37 vibrates a piezoelectric element 19 connected to the optical filter 18 under control of the microcomputer 40. The optical filter vibration control circuit 37 vibrates the piezoelectric element 19 based on the instruction from the microcomputer 40 so that the piezoelectric element 19 is vibrated at a predetermined vibration amplitude for a predetermined vibration time in a predetermined axial vibration direction.

A non-volatile memory 38 is a non-volatile recording medium and retains setting values that are set by the user, such as a shutter speed, aperture value, and image capturing sensitivity, and various types of other data even in a state where the image capturing apparatus 100 is off. The non-volatile memory 38 stores a constant number for an operation of the microcomputer 40 and a program. The program refers to a program for executing a flowchart described below in the present exemplary embodiment. A volatile memory 39 retains data that is to be temporarily stored, such as an internal state of the image capturing apparatus 100 and information about the recording medium 28 that is removable.

An inside-finder liquid crystal display unit 41 displays a frame that indicates a currently-autofocused focusing point and an icon that represents a camera setting state via an inside-finder liquid crystal driving circuit 42 under control of the microcomputer 40. An outside-finder liquid crystal display unit 43 displays various camera setting values, such as a shutter speed and an aperture, via an outside-finder liquid crystal driving circuit 44 under control of the microcomputer 40.

An operation unit 70 includes various operation members configured to receive user operations. The operation unit 70 includes a release button 201, a main electronic dial 202, a sub-electronic dial 203, a power switch 204, a protect button 205, and a delete button 206 as described below. The operation unit 70 further includes an enlargement mode button 207, a reproduction instruction button 208, a menu button 209, a focusing point selection button 210, a multi-controller 211, a moving image lever 212, an optical tracking pointer 213, and an AF start button 214 as described below.

The microcomputer 40 is a control unit configured to control each component of the image capturing apparatus 100. The microcomputer 40 loads a program stored on the non-volatile memory 38 onto the volatile memory 39 and executes the loaded program to thereby execute a process described below.

Figure 2A:
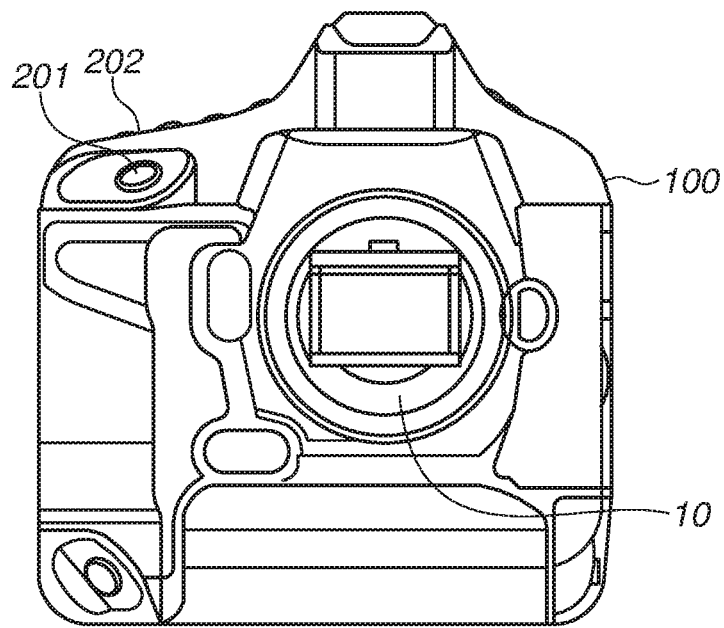
FIGS. 2A and 2B illustrate an example of an external configuration of the image capturing apparatus.
Figure 2B:
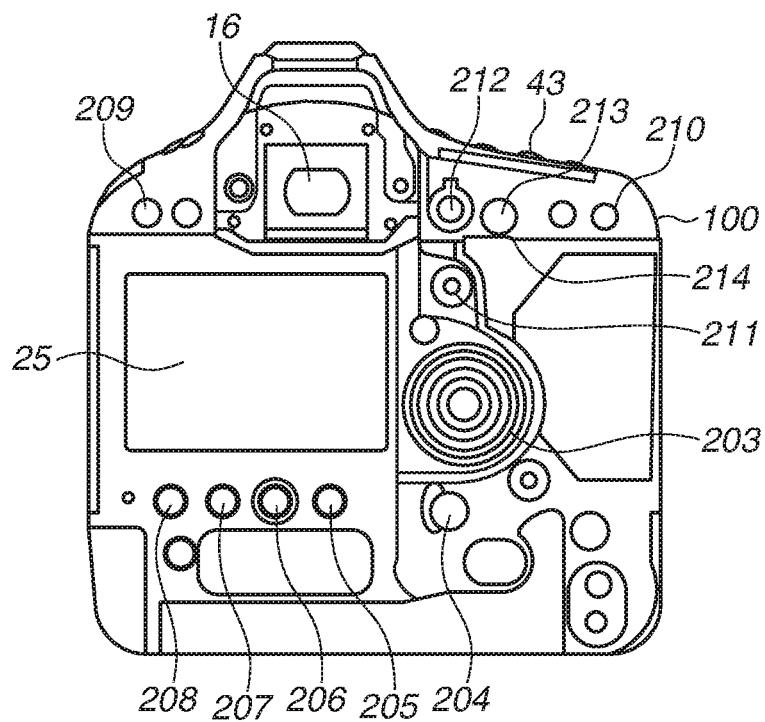

FIGS. 2A and 2B illustrate an example of an external configuration of the image capturing apparatus 100. FIG. 2A is a front view, and FIG. 2B is a back view. Components similar to those in FIG. 1 are given the same reference numerals.

The release button 201 is an operation member for issuing an instruction to prepare for image capturing and an instruction to capture an image. In response to the release button 201 being half-pressed, the subject luminance is measured and focusing is performed. In response to the release button 201 being fully pressed, the shutter is released and an image is captured.

The main electronic dial 202 includes a rotary operation member, and the main electronic dial 202 is turned to set a setting value such as a shutter speed and an aperture and to delicately adjust an enlargement magnification in an enlargement mode.

The sub-electronic dial 203 includes a rotary operation member, and the sub-electronic dial 203 is turned to set a setting value such as an aperture and an exposure correction and to perform a forward scrolling operation of a single image while the image is being displayed.

The power switch 204 is an operation member for turning the power on and off.

The protect button 205 is an operation member for executing processing, such as protection processing and rating processing, on an image stored on an external recording medium or an internal recording medium of the image capturing apparatus 100.

The delete button 206 is an operation member for issuing an instruction to delete an image stored on an external recording medium or an internal recording medium of the image capturing apparatus 100.

The enlargement mode button 207 is an operation member for receiving an operation to issue an instruction to change an operation mode to the enlargement mode (an instruction to start the enlargement mode) and an instruction to leave the enlargement mode (an instruction to end the enlargement mode) while an image is being reproduced.

The reproduction instruction button 208 is an operation member for displaying an image stored on an external recording medium or an internal recording medium of the image capturing apparatus 100 on the liquid crystal display unit 25.

The menu button 209 is an operation member for displaying various setting screens on the liquid crystal display unit 25.

The focusing point selection button 210 is an operation member for entering into a mode for selecting a focusing point that is an AF start point.

The multi-controller 211 is an operation member for setting a focusing point that is an AF start point while an enlarged image is being displayed and is operable in a plurality of directions to move an enlarged frame (enlarged range).

The moving image lever 212 is an operation member for issuing an instruction to change an operation mode to a moving image capturing mode that is a state where a moving image is recordable. The position of a knob of the moving image lever 212 is changed, and the knob is statically fixed at the changed position. The position of the moving image lever 212 is changed to an ON position, so that an instruction to change the operation mode to the moving image capturing mode can be issued. In this way, simply a one-touch operation is needed to change the operation mode to the moving image capturing mode, and thus, the operability increases. An OFF position of the moving image lever 212 that is different from the ON position corresponds to a still image capturing mode. The moving image lever 212 is not limited to an operation member configured to be switched between two positions including the ON position (corresponding to the moving image capturing mode) and the OFF position (corresponding to the still image capturing mode), but the moving image lever 212 can be an operation member configured to be switched between three or more positions including a position corresponding to a power off mode and a position corresponding to a reproduction mode. In other words, the moving image lever 212 is an operation member that is moved to a position corresponding to one of a plurality of operation modes including the moving image capturing mode and the still image capturing mode.

The optical tracking pointer 213 is an operation member (e.g., infrared sensor) configured to receive a touch operation.

The AF start button 214 is an operation member configured to issue an instruction to start AF. The optical tracking pointer 213 is embedded in the AF start button 214, and AF can be promptly started while a touch operation and a slide operation are being performed.

In order to avoid unintentional change of the operation mode to the moving image capturing mode due to an erroneous operation on the moving image lever 212, a setting to enable/disable an instruction that is issued by operating the moving image lever 212 can be made (hereinafter, the setting will be referred to as "moving image lever enabling/disabling setting"). As long as the setting is made to "disable", a restriction state where an instruction that is issued by operating the moving image lever 212 is continually disabled is maintained.

Figure 8:
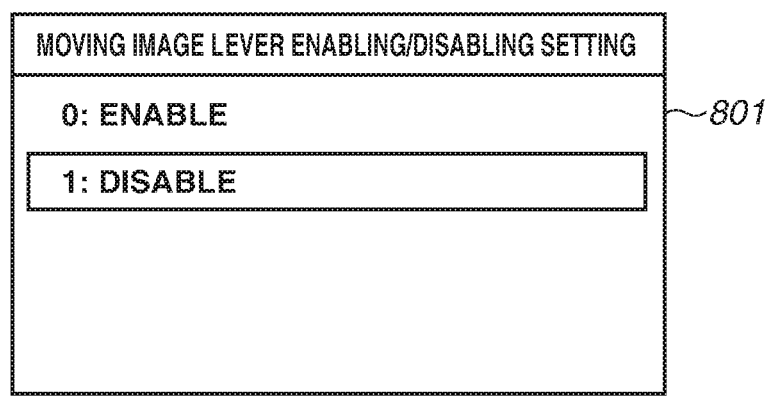
FIG. 8 illustrates an example of a moving image lever enabling/disabling setting screen.

The moving image lever enabling/disabling setting is to be made, for example, as described below. In response to the menu button 209 being pressed by the user, the microcomputer 40 displays a menu screen for changing various settings on the liquid crystal display unit 25. If a user operation is performed to select an item of the moving image lever enabling/disabling setting from the menu screen and set the selected item, the microcomputer 40 displays a moving image lever enabling/disabling setting screen 801 on the liquid crystal display unit 25 as illustrated in FIG. 8. "ENABLE" and "DISABLE" are displayed as options on the moving image lever enabling/disabling setting screen 801, and when the user selects "ENABLE" or "DISABLE", the microcomputer 40 receives an enabling setting or a disabling setting.

Processes and operations to be executed by the image capturing apparatus 100 will be described below with reference to FIGS. 3 to 9.

Figure 3:
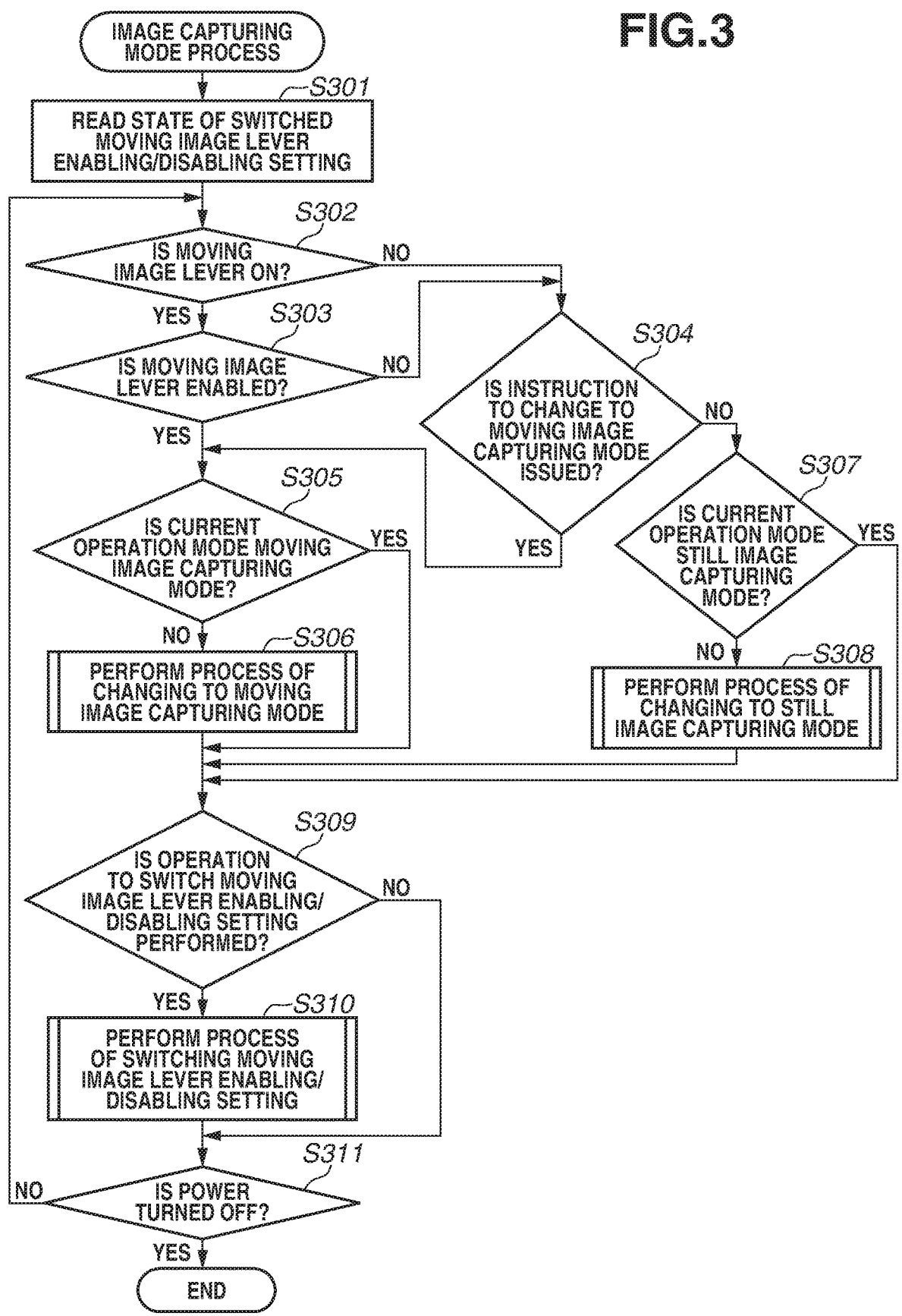
FIG. 3 is a flowchart illustrating an image capturing mode process that is performed by the image capturing apparatus.

FIG. 3 is a flowchart illustrating an image capturing mode process to be executed by the image capturing apparatus 100. The flowchart illustrated in FIG. 3 is started when the power is turned on. The microcomputer 40 loads a program stored on the non-volatile memory 38 onto the volatile memory 39 and executes the loaded program so that the process illustrated in the flowchart in FIG. 3 is realized.

In step S301, the microcomputer 40 reads the state of the moving image lever enabling/disabling setting from the non-volatile memory 38.

In step S302, the microcomputer 40 determines whether the moving image lever 212 is at the ON position (position where an instruction to change the operation mode to the moving image capturing mode is to be issued). In a case where the moving image lever 212 is at the ON position (YES in step S302), the processing proceeds to step S303. On the other hand, in a case where the moving image lever 212 is not at the ON position (NO in step S302), the processing proceeds to step S304.

In step S303, the microcomputer 40 refers to the state of the moving image lever enabling/disabling setting that is read in step S301 and determines whether the moving image lever enabling/disabling setting is made to "enable". In a case where the moving image lever enabling/disabling setting is set to "enable" (YES in step S303), the processing proceeds to step S305. On the other hand, in a case where the moving image lever enabling/disabling setting is not made to "enable" (NO in step S303), i.e., the moving image lever enabling/disabling setting is made to "disable" (restriction state), the processing proceeds to step S304.

In step S304, the microcomputer 40 determines whether an instruction to change the operation mode to the moving image capturing mode other than an instruction issued by operating the moving image lever 212 is issued. In a case where an instruction to change the operation mode to the moving image capturing mode is issued (YES in step S304), the processing proceeds to step S305. On the other hand, in a case where an instruction to change the operation mode to the moving image capturing mode is not issued (NO in step S304), the processing proceeds to step S307. Examples of an instruction other than an instruction issued by operating the moving image lever 212 include an instruction that is issued by a remote operation, such as an instruction to change the operation mode to the moving image capturing mode that is issued via a smartphone or a personal computer.

In step S305, the microcomputer 40 determines whether a current operation mode (operation mode that is set before an operation mode is to be changed in step S306) is the moving image capturing mode. In a case where the current operation mode is the moving image capturing mode (YES in step S305), the processing proceeds to step S309. On the other hand, in a case where the current operation mode is not the moving image capturing mode (e.g., case where the current operation mode is the still image capturing mode) (NO in step S305), the processing proceeds to step S306.

In step S306, the microcomputer 40 performs a process of changing the operation mode to the moving image capturing mode. Details of the process of changing the operation mode to the moving image capturing mode will be described below.

In step S307, the microcomputer 40 determines whether a current operation mode (operation mode that is set before an operation mode is to be changed in step S308) is the still image capturing mode. In a case where the current operation mode is the still image capturing mode (YES in step S307), the processing proceeds to step S309. On the other hand, in a case where the current operation mode is not the still image capturing mode (e.g., case where the current operation mode is the moving image capturing mode) (NO in step S307), the processing proceeds to step S308.

In step S308, the microcomputer 40 performs a process of changing the operation mode to the still image capturing mode. Details of the process of changing to the still image capturing mode will be described below.

In step S309, the microcomputer 40 determines whether an operation to switch the moving image lever enabling/disabling setting is performed. In a case where an operation to switch the moving image lever enabling/disabling setting is performed (YES in step S309), the processing proceeds to step S310. On the other hand, in a case where an operation to switch the moving image lever enabling/disabling setting is not performed (NO in step S309), the processing proceeds to step S311. If a user operation to select an option on the moving image lever enabling/disabling setting screen 801 in FIG. 8 that is different from the currently-set option and set the selected option is performed, the microcomputer 40 determines that an operation to switch the moving image lever enabling/disabling setting is performed.

In step S310, the microcomputer 40 performs a process of switching the moving image lever enabling/disabling setting. Details of the process of switching the moving image lever enabling/disabling setting will be described below.

In step S311, the microcomputer 40 determines whether an event (an operation on the power switch 204) that the power is turned off has occurred. In a case where the event that the power is turned off has not occurred (NO in step S311), the processing returns to step S302. On the other hand, in a case where the event that the power is turned off has occurred (YES in step S311), the image capturing mode process is ended.

Details of the process of changing the operation mode to the moving image capturing mode in step S306 will be described below.

Figure 4:
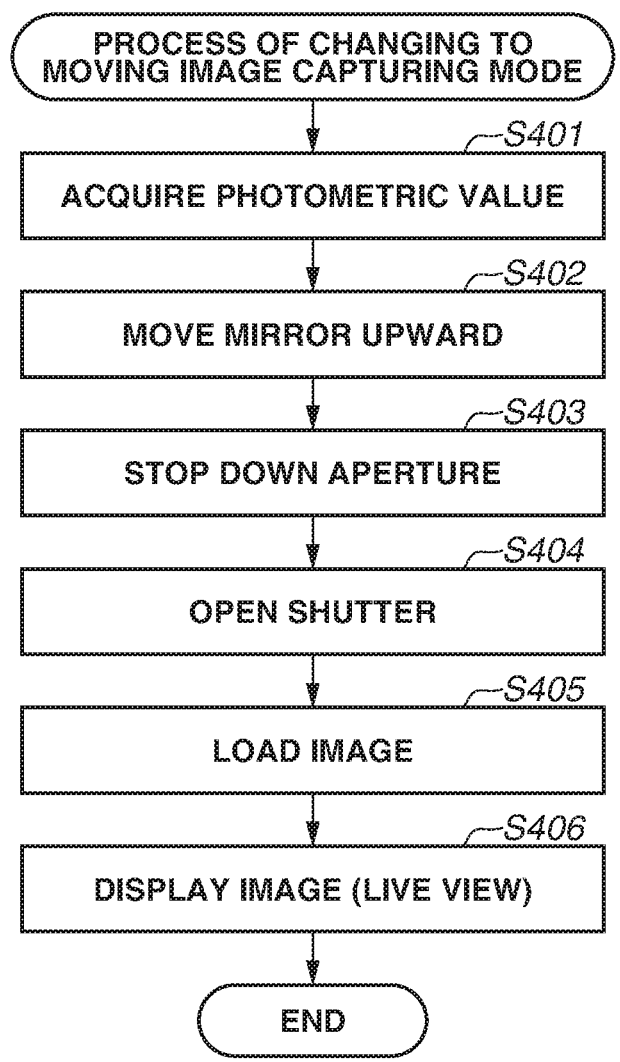
FIG. 4 is a flowchart illustrating details of a process of changing an operation mode to a moving image capturing mode.

FIG. 4 is a flowchart illustrating details of the process of changing the operation mode to the moving image capturing mode.

In step S401, the microcomputer 40 acquires a subject luminance from the AE sensor 15 and sets an electronic shutter speed, an aperture value, and an image capturing sensitivity with respect to the acquired subject luminance based on a program diagram.

In step S402, the microcomputer 40 performs control so that the quick return mirror 12 is moved upward.

In step S403, the microcomputer 40 performs control so that the aperture value set in step S401 is transmitted to the lens system control circuit 4 of the lens unit 200 via the communication terminals 6 and 10. The lens system control circuit 4 stops down the aperture 1 via the aperture driving circuit 2 based on the aperture value.

In step S404, the microcomputer 40 performs control so that the focal plane shutter 17 is opened.

In step S405, the microcomputer 40 performs control so that image loading processing is performed. Specifically, the microcomputer 40 controls a timing of driving the image sensor 20 via the timing control circuit 32 based on the electronic shutter speed set in step S401. The microcomputer 40 performs control so that the AMP circuit 21 amplifies a captured signal using a gain corresponding to the image capturing sensitivity set in step S401, the A/D conversion circuit 22 converts the amplified signal into a digital signal, and the image processing circuit 23 loads image data onto the buffer memory 26.

Figure 9:
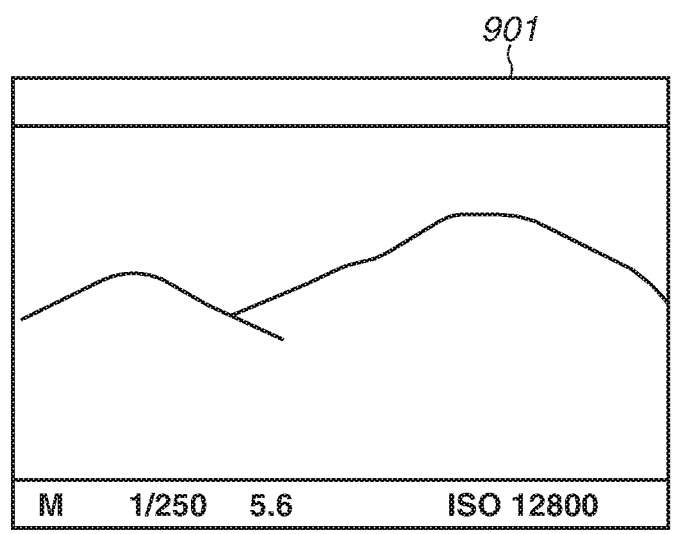
FIG. 9 illustrates a display example of a liquid crystal display unit.

In step S406, the microcomputer 40 performs control so that the image data loaded on the buffer memory 26 is displayed. Specifically, the image processing circuit 23 converts image data loaded on the buffer memory 26 and input by the memory controller 27 into an analog signal and outputs the analog signal to the liquid crystal display unit 25 via the liquid crystal driving circuit 24 under control of the microcomputer 40. Consequently, a live view image 901 is displayed on the liquid crystal display unit 25 as illustrated in FIG. 9.

Once the operation mode is changed to the moving image capturing mode as described above, various circuits are continuously operated. For this reason, if, for example, an erroneous operation to touch the moving image lever 212 occurs and the operation mode is changed to the moving image capturing mode while the image capturing apparatus 100 is being carried, the image capturing apparatus 100 continues to operate despite the intention of the user. This leads to a situation that is disadvantageous to the user, such as an increase in current consumption. If an erroneous operation is performed to issue an instruction to capture a moving image, moving image recording is started despite the intention of the user, and while moving image recording is continued, the memory card space and the remaining battery are wasted.

Details of the process of changing the operation mode to the still image capturing mode in step S308 will be described below.

Figure 5:
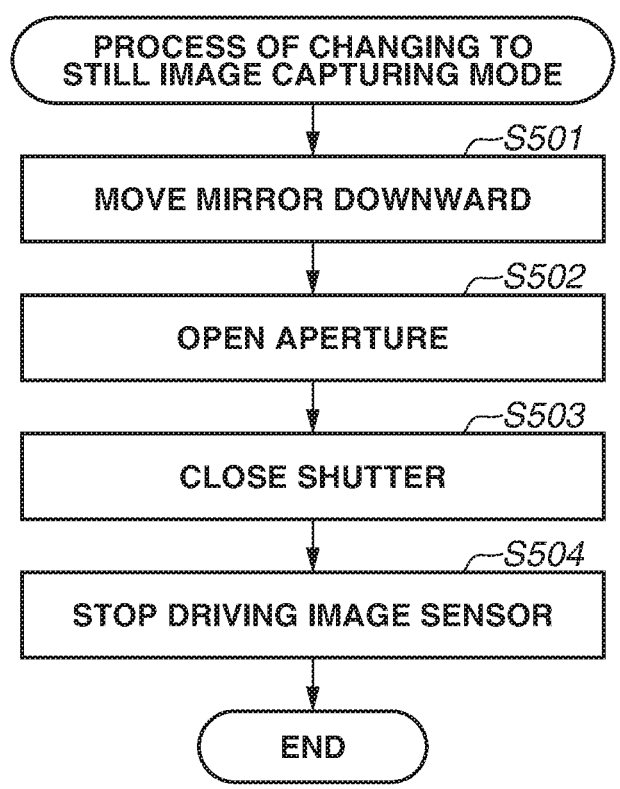
FIG. 5 is a flowchart illustrating details of a process of changing an operation mode to a still image capturing mode.

FIG. 5 is a flowchart illustrating details of the process of changing to the still image capturing mode.

In step S501, the microcomputer 40 performs control so that the quick return mirror 12 is moved downward.

In step S502, the microcomputer 40 performs control so that an instruction to open the aperture 1 is transmitted to the lens system control circuit 4 of the lens unit 200 via the communication terminals 6 and 10. The lens system control circuit 4 opens the aperture 1 via the aperture driving circuit 2 based on the instruction to open the aperture 1.

In step S503, the microcomputer 40 performs control so that the focal plane shutter 17 is closed.

In step S504, the microcomputer 40 performs control so that the driving of the image sensor 20 is stopped via the timing control circuit 32.

Once the operation mode is changed to the still image capturing mode as described above, various circuits are stopped and are not basically operated until another instruction to capture an image is issued. This state is the still image capturing mode in an optical finder mode in which a subject image can be checked using an optical finder. In the still image capturing mode that involves live-view display, a live view can be captured without stopping the driving of the image sensor 20, and a live view image is captured. Even if an erroneous instruction to capture a still image is issued, recording is not continued because image capturing is performed only for a single instruction, unlike in moving image capturing. Even if an operation that is similar to an operation to issue an instruction to capture a moving image in the moving image capturing mode is performed, moving image recording is not started. Accordingly, even if an erroneous operation is performed, a waste of the memory card space and the remaining battery is prevented.

Details of the process of switching the moving image lever enabling/disabling setting in step S310 will be described below.

Figure 6:
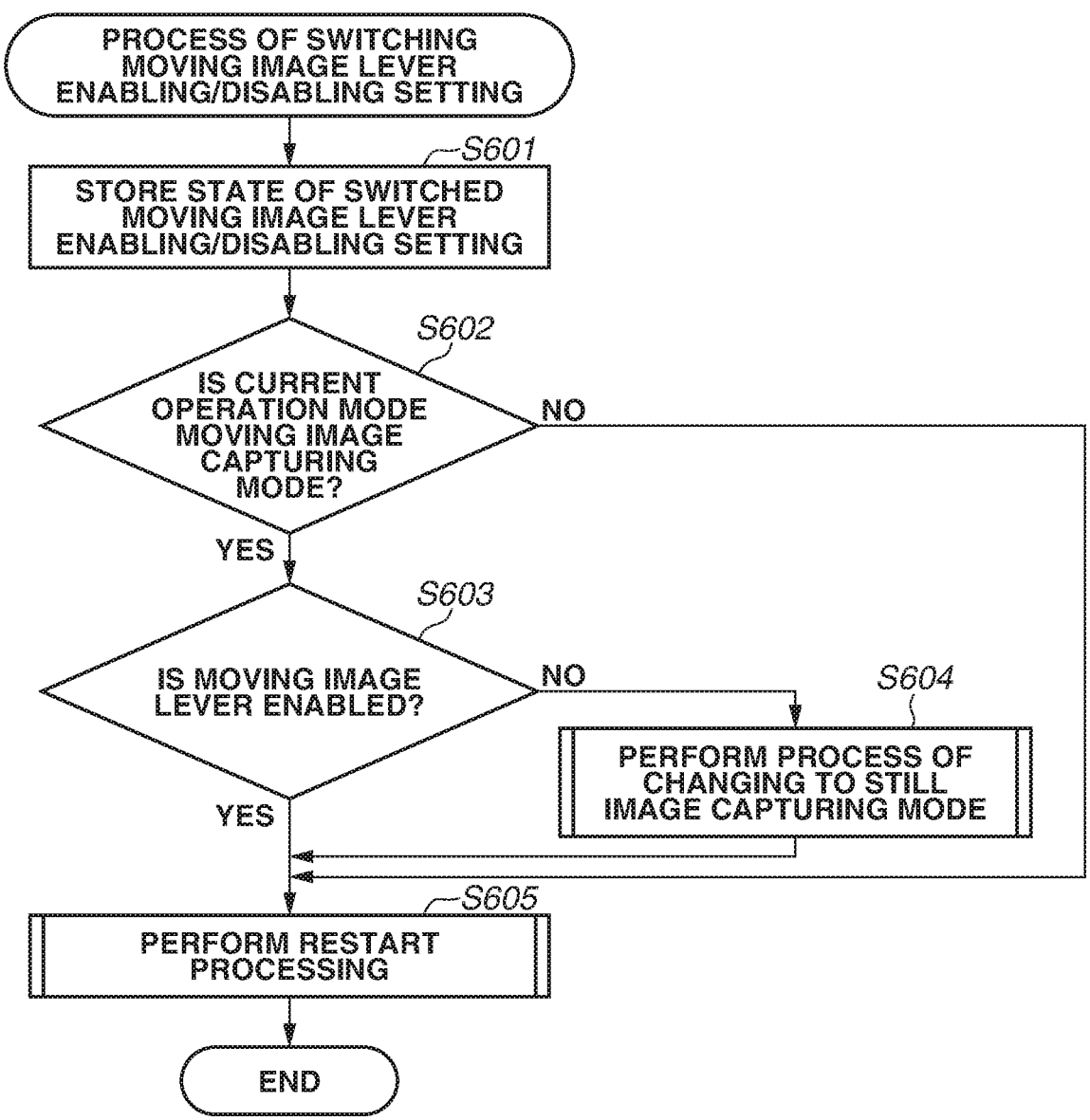
FIG. 6 is a flowchart illustrating details of a process of switching a moving image lever enabling/disabling setting.

FIG. 6 is a flowchart illustrating details of the process of switching the moving image lever enabling/disabling setting.

In step S601, the microcomputer 40 performs control so that the state of the switched moving image lever enabling/disabling setting is stored on the non-volatile memory 38 based on the switching operation determined in step S309.

In step S602, the microcomputer 40 determines whether the current image capturing mode is the moving image capturing mode. In a case where the current image capturing mode is the moving image capturing mode (YES in step S602), the processing proceeds to step S603. On the other hand, in a case where the current image capturing mode is not the moving image capturing mode (NO in step S602), the processing proceeds to step S605.

In step S603, the microcomputer 40 refers to the state of the moving image lever enabling/disabling setting and determines whether the moving image lever enabling/disabling setting is set to "enable". In a case where the moving image lever enabling/disabling setting is set to "enable" (YES in step S603), the processing proceeds to step S605. On the other hand, in a case where the moving image lever enabling/disabling setting is not set to "enable" (NO in step S603), i.e., the moving image lever enabling/disabling setting is set to "disable" (restriction state), the processing proceeds to step S604.

In step S604, the microcomputer 40 performs a process of changing the operation mode to the still image capturing mode. The process of changing the operation mode to the still image capturing mode is similar to that in step S308, so that description thereof is omitted.

In step S605, the microcomputer 40 performs restart processing. Details of the restart processing will be described below.

Details of the restart processing in step S605 will be described below.

Figure 7:
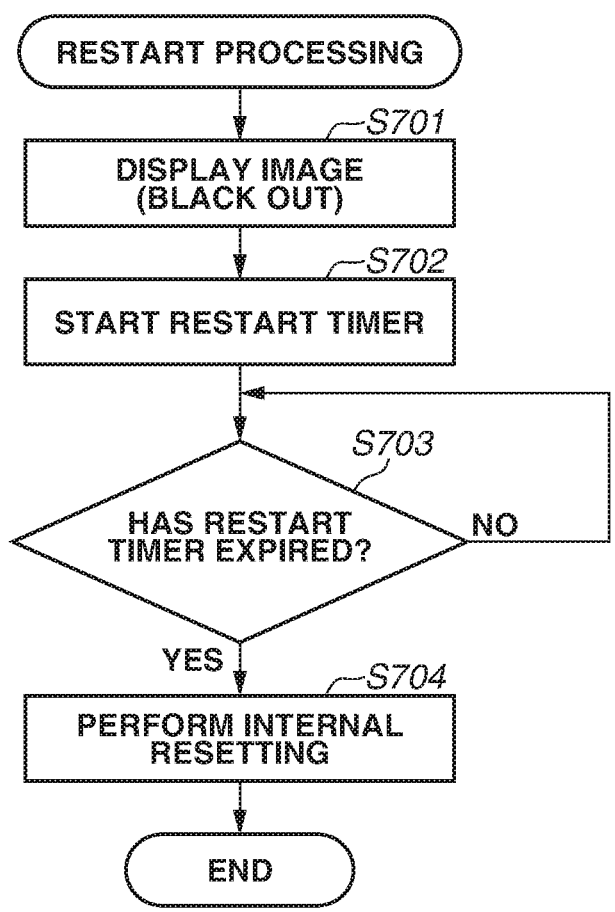
FIG. 7 is a flowchart illustrating details of a restart process.

FIG. 7 is a flowchart illustrating details of the restart processing.

In step S701, the microcomputer 40 performs control so that a display screen of the liquid crystal display unit 25 is blacked out. Specifically, the image processing circuit 23 converts black image data into an analog signal and outputs the analog signal to the liquid crystal display unit 25 via the liquid crystal driving circuit 24 under control of the microcomputer 40.

In step S702, the microcomputer 40 performs control so that a restart timer is started.

In step S703, the microcomputer 40 waits until the restart timer expires, and when the restart timer expires, the processing proceeds to step S704.

In step S704, the microcomputer 40 issues an instruction so that internal resetting is performed.

When the moving image lever enabling/disabling setting is set to "disable" while the image capturing apparatus is operating in the moving image capturing mode corresponding to a first operation mode, the operation mode is changed to the still image capturing mode corresponding to a second operation mode. This prevents an inconsistency between the operation mode and the setting to disable an instruction that is issued by operating the moving image lever 212, so that a user is not confused. For example, even when the moving image lever 212 is at the ON position and an operation is performed in the moving image capturing mode, the operation mode is forcibly changed to the still image capturing mode, which is different from the operation mode specified by the moving image lever 212, when the moving image lever enabling/disabling setting is switched to "disable".

The moving image lever enabling/disabling setting is a setting to enable and disable an instruction that is issued by operating the moving image lever 212, and even if the moving image lever enabling/disabling setting is set to "disable", it is possible to change the operation mode to the moving image capturing mode by an instruction that is different from an instruction that is issued by operating the moving image lever 212. Specifically, even if the operation mode is changed to the still image capturing mode as a result of the moving image lever enabling/disabling setting having been switched to "disable" while the image capturing apparatus is operating in the moving image capturing mode, it is still possible to change the operation mode to the moving image capturing mode afterward by an operation (e.g., remote operation described above) other than an operation on the moving image lever 212.

When the operation mode is changed to the still image capturing mode, restart processing is also performed, and when restart processing is performed, the screen display is blacked out, whereby the user can easily recognize that the operation mode is changed to the still image capturing mode. This process of changing the operation mode to the still image capturing mode with restart processing is performed when a user operation to select and set "disable" on the moving image lever enabling/disabling setting screen 801 in FIG. 8 is performed in a case where the moving image lever enabling/disabling setting is set to "enable" while the image capturing apparatus is operating in the moving image capturing mode.

As long as the moving image lever enabling/disabling setting is set to "disable", the operation mode is not changed to the moving image capturing mode even if the moving image lever 212 is moved to the ON position by an erroneous operation. This prevents an occurrence of a situation that is disadvantageous to the user, such as an increase in current consumption, when the user does not intend, so that the user who does not intend to use the moving image capturing can safely use the image capturing apparatus 100.

While an exemplary embodiment of the present invention is described above, the present invention is not limited to the disclosed exemplary embodiment, and various modifications and changes are possible within the spirit of the invention.

The above-described various types of control described as being performed by the microcomputer 40 can be performed by a single piece of hardware or can be shared by a plurality of pieces of hardware (e.g., a plurality of processors or circuits) to control the entire apparatus.

While the present invention has been described in detail with reference to the exemplary embodiment, the present invention is not limited to the specific exemplary embodiment, and various forms within the spirit of the invention are also encompassed within the scope of the invention. The exemplary embodiment described above is a mere exemplary embodiment, and it is possible to combine exemplary embodiments.

While the digital single-lens reflex camera is described in the above-described exemplary embodiment, the term "image capturing apparatus" in the present invention includes all apparatuses that include an image capturing function.

The present invention is applicable not only to an image capturing apparatus but also a control apparatus that communicates with an image capturing apparatus via wired or wireless communication and remotely controls the image capturing apparatus. Examples of an apparatus that remotely controls an image capturing apparatus include a smartphone, a tablet personal computer (tablet PC), and a desktop personal computer (desktop PC). An image capturing apparatus can be controlled remotely by transmitting a notification of a command to execute various operations and settings from a control apparatus to the image capturing apparatus based on an operation performed by the control apparatus or a process performed by the control apparatus. Further, a live view image captured by the image capturing apparatus can be received via wired or wireless communication and displayed by the control apparatus.

The present invention is applicable not only to an image capturing apparatus but also to a wide variety of electronic apparatuses that include an operation member for issuing an instruction to change the operation mode to the first operation mode and make a setting to enable and disable an instruction that is issued by operating the operation member. Examples of such an electronic apparatus include a personal computer, a personal digital assistant (PDA), a mobile phone terminal, a mobile image viewer, a printer apparatus that includes a display, a digital photo frame, a music player, a game machine, and an electronic book reader.

The present invention reduces a possibility of occurrence of a situation where an operation is performed in an operation mode that is not intended by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-082143, filed Apr. 23, 2019, which is hereby incorporated by reference herein in its entirety.

What is claimed is:
1. An image capturing apparatus comprising:
a user operation member configured to issue an instruction to change an operation mode of the image capturing apparatus; and
at least one memory and at least one processor, the processor being configured to:
set a restriction state where changing the operation mode to a first operation mode of the image capturing apparatus by operating the user operation member is restricted; and perform control to change the operation mode to a second operation mode of the image capturing apparatus different from the first operation mode in a case where the restriction state is set when the operation mode is set to the first operation mode.

2. The image capturing apparatus according to claim 1, wherein the user operation member is moved to a position corresponding to one of a plurality of operation modes including the first operation mode and the second operation mode, and wherein the processor performs control to change the operation mode to the second operation mode in a case where the restriction state is when the user operation member is at a position corresponding to the first operation mode and the operation mode is set to the first operation mode.

3. The image capturing apparatus according to claim 1, wherein the processor performs control to change the operation mode to the second operation mode along with restart processing to restart the electronic apparatus in a case where the processor changes a state to the restriction state while the electronic apparatus is operating in the first operation mode.

4. The image capturing apparatus according to claim 3, wherein the processor blacks out a screen display when the restart processing is performed.

5. The image capturing apparatus according to claim 1, wherein the operation mode is changeable to the first operation mode in response to an instruction that is different from the instruction issued by operating the user operation member even while the restriction state is set.

6. The image capturing apparatus according to claim 5, wherein the instruction that is different is an instruction issued by a remote operation.

7. The image capturing apparatus according to claim 1, further comprising an image sensor.

8. The image capturing apparatus according to claim 7, wherein the first operation mode is a moving image capturing mode in which the image sensor captures a moving image.

9. The image capturing apparatus according to claim 8, wherein the second operation mode is a still image capturing mode in which the image sensor captures a still image.

10. The image capturing apparatus according to claim 7, wherein the processor drives a mirror to change a state from a state where a live view is captured using the image sensor to a state where a subject image is checked using an optical finder, when the processor changes the operation mode to the second operation mode.

11. The image capturing apparatus according to claim 7, wherein the processor closes a shutter while changing the operation mode to the second operation mode.

12. The image capturing apparatus according to claim 1, wherein the user operation member is a lever to be moved to a predetermined position to issue an instruction to change the operation mode to the first operation mode.

13. A method of controlling an image capturing apparatus that includes user operation member configured to issue an instruction to change an operation mode of the image capturing apparatus, the method comprising:

setting a restriction state where changing the operation mode to a first operation mode of the image capturing by operating the user operation member is restricted; and performing control to change the operation mode to a second operation mode of the image capturing apparatus different from the first operation mode in a case where the restriction state is set when the operation mode is set to the first operation mode.

14. A non-transitory computer-readable storage medium that stores a program for causing a computer to function as the processor of the image capturing apparatus according to claim 1.

15. The image capturing apparatus according to claim 1, further comprising:

a display; and a finder independent of the display, wherein an image is not visually recognizable using the finder but is visually recognizable with the display in the first operation mode, and an image is visually recognizable using the finder in the second operation mode.

* * * * *